United States Patent [19]
Sawatzki et al.

[11] Patent Number: 4,538,301
[45] Date of Patent: Sep. 3, 1985

[54] PROTECTIVE DEVICE

[75] Inventors: Harry L. Sawatzki, Schaan, Liechtenstein; Markus Koller, Rudolfstetten, Switzerland; Hansjörg Schaedler, Eschen, Liechtenstein

[73] Assignee: Dierk Filmer, Varel, Fed. Rep. of Germany

[21] Appl. No.: 454,866

[22] Filed: Dec. 30, 1982

[30] Foreign Application Priority Data

Dec. 31, 1981 [CH] Switzerland .................. 8368/81

[51] Int. Cl.³ .................. F41H 1/02; F41H 5/04; A41D 13/00
[52] U.S. Cl. .................. 2/2; 2/411; 428/911
[58] Field of Search .................. 2/2, 16, 161 A, 411, 2/25, 92, 72, 120; D2/27; 428/47, 56, 77, 116, 167, 180, 181, 911

[56] References Cited

U.S. PATENT DOCUMENTS

| 1,777,878 | 10/1930 | Evans | 2/2 |
|---|---|---|---|
| 1,841,193 | 1/1932 | Lidston | 2/16 |
| 2,424,985 | 8/1947 | Howard | 2/27 |
| 3,125,762 | 3/1964 | Glahe | 2/2 |
| 3,285,768 | 11/1966 | Habib | 428/167 |
| 3,529,306 | 9/1970 | Thorne | 2/411 |
| 3,574,861 | 4/1971 | Hale | 2/2 |
| 3,605,117 | 9/1971 | Latina | 2/16 |
| 3,762,977 | 10/1973 | Langfeldt | 428/181 |
| 3,867,239 | 2/1975 | Alesi et al. | 428/48 |
| 4,030,427 | 6/1977 | Goldstein | 428/911 |
| 4,241,457 | 12/1980 | Klein et al. | 428/911 |

FOREIGN PATENT DOCUMENTS 2504362 10/1982 France .................. 2/161 A

Primary Examiner—Werner H. Schroeder
Assistant Examiner—Steven N. Meyers
Attorney, Agent, or Firm—Cushman, Darby & Cushman

[57] ABSTRACT

To protect a body sensitive to impact or pressure, e.g. the backbone of a two-wheeled vehicle rider or of an athlete, several, at least partially uniform, essentially compression-resistant elements (1; 1a–1d; 1'), expediently in the form of blocks or loops (1'), are arranged essentially directly adjoining one another and joined flexibly and with high tension strength to one another along their inner surfaces (10a) or edges facing the body. The connection is provided preferably with the aid of a strip-shaped layer (2) of cloth, metal or plastic foil to which the elements (1; 1a–1d; 1') are attached with high tension strength by cementing, tacking or in another manner.

13 Claims, 6 Drawing Figures

PROTECTIVE DEVICE

FIELD OF THE INVENTION

The invention relates to a protective device, especially for a body sensitive to impacts or blows from a certain direction, whereas said device should remain movable in at least one direction—especially in the direction opposite the expected impact or blow. Such a protective device is expedient e.g. for the spinal columns of athletes, motorcycle riders etc. which, in the event of an accident, can be endangered from behind by an impact or blow, frequently resulting in paraplegia or even death.

BACKGROUND OF THE INVENTION

To date it has been possible to protect the head with a helmet, which is, however, simpler than protecting the trunk because the external shape of the head remains unchanged even when the person in question moves. As is known this is not the case with the trunk. A device must therefore be created for the spinal column which permits the body to be bent forward, but which prevents backward buckling in the event of a blow from the rear. Because of its heavy weight and the lack of mobility a protective suit similar to a knight's armour is out of the question.

SUMMARY OF THE INVENTION

It is therefore the object of the invention to create a protective device on the one hand which does not limit the mobility of its bearer and is correspondingly light in weight, and on the other hand to provide good protection against a blow, an impact or pressure from a certain direction. This is accomplished by the present invention by essentially directly-adjoining compression-resistant elements being foreseen on the side of the body to be protected, said elements being joined to one another flexibly and with high tension resistance along their inside surfaces or edges facing the body. Such a protective device permits the body to be flexed, inclined or bent toward the front side facing away from the side to be protected, but if offers a force acting from the rear side to be protected a resistance similar to a rigid shield.

The elements can be e.g. four-sided prisms arranged in at least one row, in the case of a straight-line course of the protective device said prisms having a rectangular cross-section, in the case of a curved course, for example following the spinal column, at least partially trapezoidal. Insofar as the surface to be protected is or should be bent in more than one plane it is expedient for the elements to have the shape of pyramids or pyramid stubs, in which case they are present in at least two rows.

It can be clearly seen that in the case of a force acting from outside the elements, with their surfaces facing each other, are pressed together and that they therefore expediently have an especially high compression resistance, at least in this area, possibly also even only low elasticity to prevent any springing compression. For many applications, especially for those in which the protective device is worn by a person, the particularly compression-resistant metals are excluded for reasons of weight. It is therefore expedient for the elements to have at least one layer which increases the compression resistance perpendicular to the blow only on their outer and/or side surfaces. The block can then be hollow or filled only with a skeleton structure, or the block element itself or the core filling out a cavity can also consist of structural foam, especially integral polyurethane foam. The layer(s) which increase the compression resistance of the elements in the direction perpendicular to a blow or impact to be expected can be made either of fiberglass-reinforced plastic or metal, but they can also consist of a compression-resistant polyurethane material integrally joined to the polyurethane foam core.

The tension or tearing strength of the element interconnections of the elements is naturally especially important, said interconnections producing the formation of a rigid protective shield in the case of an impact or blow from the outside. The connection can be made with hinges, but according to a preferred construction configuration it is especially appropriate for the elements to be joined together by a layer attached to their inner surfaces of non-stretching threads or fibers intersecting the edge direction, or for the fibers to take the form of a fabric or matting.

As such, non-stretching fibers are known, e.g. such fibers consisting of a polyimide, glass or metal.

Using partially prismatic or cone stub shaped block elements the protective device according to the present invention, when being used to protect a human spinal column, can also be taken around the sides of the body to absorb impacts or blows from this direction insofar as the required mobility is not impeded to a more than bearable extent.

BRIEF DESCRIPTION OF THE DRAWINGS

Further details are given in the following description of construction examples shown schematically in the drawing.

FIG. 1 shows a perspective view of a first embodiment for illustrating the basic principle of the invention using a plurality of of elements interconnected by a layer of stretch resistant material, whereas

DETAILED DESCRIPTION OF THE DRAWINGS

As will be explained below in detail the protective device according to the present invention is constituted such that it yields to a pressure on one side and is therefore completely flexible, but that it absorbs an impact or blow from the other side, resists the impact and in essence retains its form. In this way the backbones of e.g. two-wheeled vehicle riders or athletes can be protected without impeding mobility.

Figure 1:
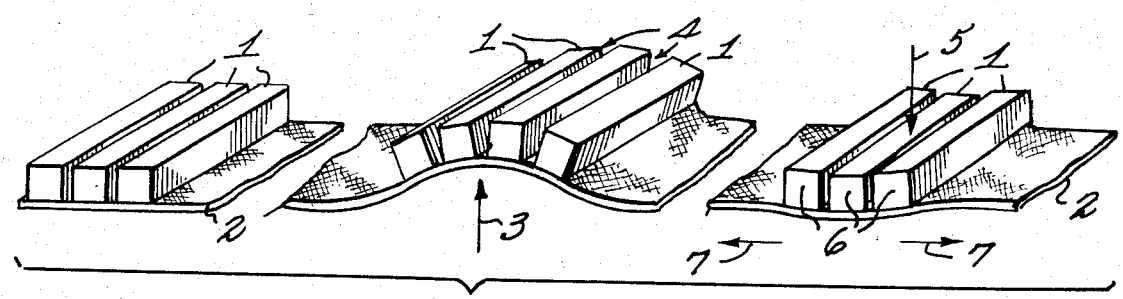

This can be accomplished e.g. in the manner shown in FIG. 1, in which single, essentially directly adjacent prismatic elements 1 have a high tension strength connection with one another on their side facing the body by means of a fabric or wire mat. Instead of the fabric 2 any other type of connection can be foreseen which provides for the intended narrow distance between the elements, as well as the flexibility of the elements to one another. The block elements 1 can be interconnected e.g. by meshing metal eyes screwed into their side edges, possibly into a recess thereof, or by using another type of hinge connection.

However, a matting, a fabric or a wire mat 2 in the manner shown in FIGS. 1-3 and 5 is preferably foreseen, in which case the fibers extend to the extent possible perpendicular to the edges of the block elements and expediently consist of polyimide, glass or metal. Because of its high stretch resistance tire cord is also very suitable.

When the body moves a pressure is exerted on the fabric 2 as symbolized by the arrow 3, in which case the elements yield and project beam-like away from the surface of the fabric 2, so that wedge-shaped cavities 4 opening outwards occur between them. They therefore do not impede the mobility of the body.

In the case of an impact or pressure from the outside as symbolized by arrow 5, in order to yield the block elements 1 would have to form such wedge-shaped cavities on the underside as well. However, they are fixed there in their spacing to one another by the fabric 2 or the like, resulting in 2 circumstances: for the one part the outer edges of the elements 1 are pressed together by the impact force 5 as symbolized by arrow 6, thereby absorbing a part of the impact force 5. For the other part the elements 1 transmit a tension force symbolized by arrow 7 to the underlying fabric 2 or the like, whereby a further portion of the impact force 5 is neutralized. A remaining part of the impact force 5 is transmitted to the body, but it is distributed over a relatively large surface so that the pressure per unit area is very low. The reason for this is that the elements 1 pressed together as symbolized by the arrows 6 act as a single piece with a large surface area.

The consequences from the above are that it is on the one hand advantageous for at least the outer edges of the elements 1 to be reinforced (cf. FIG. 4) to better resist the pressure 6. On the other hand it is important for the fixation with the fabric 2 or the like to have especially high strength in order for the tension 7 to be transmitted by the fixation. Suitable types of fixation are e.g. glueing and or tacking with clips or other known types of fasteners such as rivets, nails, screws etc.

Figure 2:
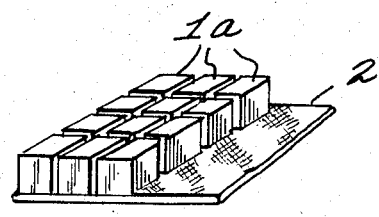
FIGS. 2 and 3 show construction variants.
Figure 3:
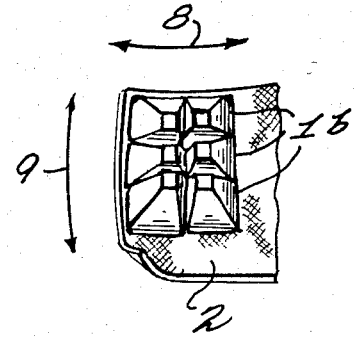

Due to the prismatic form of the block elements 1 of the construction in FIG. 1 the protective device can be deformed by a pressure 3 only in one direction or in one plane, i.e. essentially cylindrically. If conversely a greater mobility or flexibility is also desired in other directions, cubicle elements 1a as shown in FIG. 2 can also be foreseen. If flexibility to the inside, i.e. to the side of the fabric 2 or a corresponding foil, is also desired, when the individual elements 1b can also have the shape of pyramid (stubs) according to FIG. 3, permitting flexibility inward as symbolized by arrows 8 and 9. The chamfering of the side surfaces of the elements 1b must naturally be limited corresponding to the allowable extent of flexure as symbolized by arrow 8 or 9.

It has already been mentioned above that due to the pressure forces 6 (FIG. 1) it is expedient to reinforce the outer edges or the outer surface 10 (FIG. 4) by an especially compression-resistant layer 11. This layer 11 can then consist of fiber-reinforced plastic or metal. In this case two contradictory requirements are to be accounted for: on the one hand the compression resistant in the area of the layer 11 should be as high as possible; on the other hand if the element were made of solid metal the protective device would be too heavy. For this reason it is expedient for at least the core of the (hollow) elements to consist of structural foam, especially of integral polyurethane foam. This foam also has a certain elasticity and by virtue of its resistance to deformation dissipates an additional portion of the impact energy without the occurrence of flexure toward the internal side to be protected. A flexurally stiff material can also possibly be foreseen on the inside surface for the purpose of preventing this very bending. Other measures can naturally also be taken to achieve a, especially elastic, resistance to deformation. For example, the layer 11 with a rectangular plan view can be foreseen on a cylindrical element body, the generatrices of which are not straight but wavy lines, the waves of which are compressed in the event of an impact. For manufacture it is advantageous that the layer 11 consist of a compression-resistant polyurethane material integrally joined with the polyurethane foam core or polyurethane foam element.

The layer 11 can naturally also extend uninterrupted over the surface 10 so that it consists essentially only of an edge guard for the cube or prism edges, possibly with a stiffening skeletal structure in between. The reinforcement layer 11 for the edges of the outside surface 10 can naturally also be foreseen on elements with a different shape than the element 1a in FIG. 4, e.g. on elements 1, 1b, 1c or 1d. If for reasons of simplicity only a few elements 1 or 1a to 1d are shown in each of the figures 1–5, it is nevertheless clear that in practice the stratus 2 is completely covered with them. On the other hand it is quite possible, for protecting only single endangered parts of the body, to foresee the elements only in the area of these parts and to leave the stratus 2 free of them between said parts, said stratus 2 being joined, as mentioned, to the inside surfaces 10a of the block elements.

Figure 5:
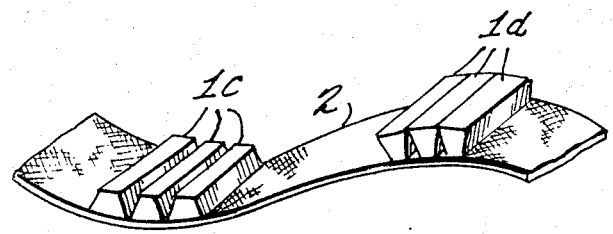
FIG. 5 shows a further embodiment in a perspective view.

As clearly shown in FIG. 5 the elements 1c, 1d mentioned above of trapezoidal cross-section and reversed arrangement are advantageous where the protective must adapt to bending in various directions. This applies e.g. just in the case of the spinal column. If desired other elements of various shapes can be arranged in combination on a single protective device, say for other applications. This can be advantageous especially for the protection of several parts of the body in order to adapt to the respective movement requirements.

Figure 6:
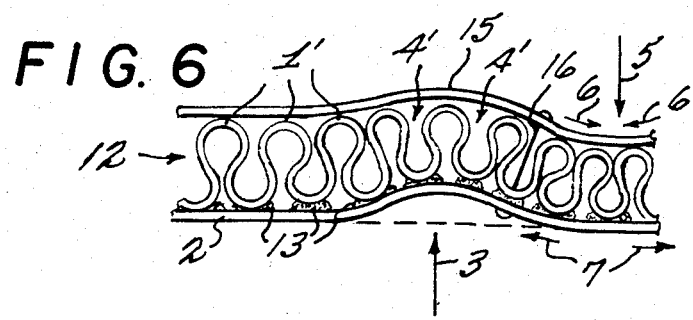
FIG. 6 is a cross-sectional view through the layer of stretch resistant material.

With the especially preferred construction as shown in FIG. 6 the individual elements 1' are formed by the narrowly adjacent, paunchy loops of a laminate material 12 of meandering cross section. This laminate material 12 is relatively stiff and consists e.g. of metal, but preferably of a stiff plastic foil which can have a thickness of e.g. 2 mm. The loops of this material 12 forming the elements 1' are bulged pear-shaped in the manner shown in FIG. 6 such that the loops normally support one another with their paunch sides. In practice the loop height can be e.g. 20 mm. Only when pressure is applied from the inside as symbolized by the arrow 3 are cavities 4' formed which in function correspond to the cavities 4 shown in FIG. 1. In the opposite case, namely with an impact or pressure from outside as symbolized by arrow 5 the loop elements 1' are pressed together by the pressure forces 6, in which case the elasticity of the loops or of the material 12 results in a resistance to deformation to absorb an additional protion of the pressure force 5. The advantage of this construction can thereby already be recognized because in this case an especially simple, easy to work and nevertheless firm and durable material is used to form all elements 1' out of one piece.

In the case of pressure from the outside (arrow 5) tension forces 7 occur in turn on the inside, which are transmitted to the underlying stratus 2, also expediently consisting of plastic material, via the cemented points 13 shown in FIG. 6 on the underside of the loop elements 1'. By viewing the dashed line 14 it can be seen that there is no pressure deformation of the protective device inward, but under pressure the thickness or loop height can decrease as can be seen in a comparison between the left and right sides of FIG. 6. In any case, practical tests have shown that such a protective device is as hard as a board or shield against blows from the outside as symbolized by arrow 5, and that it can effectively fend off such blows from the body.

According to the illustrations of FIGS. 1-5 the elements 1 and 1a-1d would be completely unprotected to the outside and could therefore easily become caught somewhere and torn out of their anchorage. It is therefore advantageous for the protective device to have a possibly elastic covering layer 15 on the outside of the elements. In FIG. 6 this protective layer 15 is shown at a small distance from the top side of the loop elements 1' to indicate that this layer 15 is not or may not be joined to the loop elements 1' in order to assure the formation of cavaties 4' in the case of pressure from the inside as symbolized by arrow 3, thereby retaining the flexibility to one side. The protective layer 15 can be joined to the stratus 2, preferably on the outside edge of the protective device at the side, especially by welding; between the loop elements 1' joining cords or ribbons 16 can however also be foreseen to connect the two stratuses or layers 2 and 15. If the protective layer 15 is shown only in FIG. 6, the above argumentation clearly shows that it can be used for the other constructions as well. It can be made essentially of the same material as the stratus 2, but in a specific protective device it need not consist of the same material.

Figure 4:
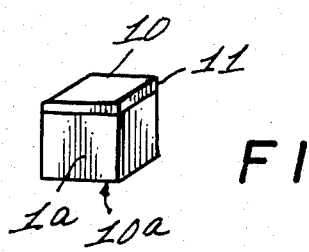
FIG. 4 shows a single element similar to the construction in FIG. 2.

In the scope of the invention a large number of construction configurations are possible; in the event that e.g. strong threads, chains or wires are foreseen as a connection between the block elements 1 or 1a-1d, said connecting elements can also be threaded through holes in the block elements near the inner surface 10a so that they are strung on the thread in a manner similar to pearls and expediently held against shifting by knots or other fastenings. In addition, the material 12 could be fitted with a ribbed layer such that the ribs reinforce the adjoining paunch surfaces, possibly also the outer surfaces of the loop elements 1', thereby assuming the role of the layer 11. This ribbed layer can either extend to the side surface or only be foreseen to the effect that the loop elements 1' support one another with their ribs. However, the ribs can also naturally consist of the material 12 in one piece. In FIG. 4 it can moreover be seen that the layer 11 occupies a part of the side surface of the block element 1a corresponding to its thickness.

We claim:

1. In a protective device for dissipating energy delivered by an impact or blow from a certain direction:
   a series of pressure resistant, stiff elements substantially arranged adjacently to each other, each of said elements having
   an outer surface extending in a first plane and being exposed to said energy,
   side surfaces extending each in a plane intersecting said first plane and propping against each other, whereby said elements form a rigid shield which essentially follows the course of the body portion to be protected, and
   an inner surface opposite to said outer surface;
   said elements being frusto-pyramidal type elements having a base surface forming said inner surface, said frusto-pyramidal type elements being arranged in at least two rows; and
   stretch resistant material interconnecting said elements at said inner surfaces to allow said elements to flex against said direction and to rigidly shield against said impact or blow.

2. In a protective device for dissipating energy delivered by an impact or blow from a certain direction:
   a series of pressure resistant, stiff elements substantially arranged adjacently to each other, each of said elements having
   an outer surface extending in a first plane and being exposed to said energy,
   side surfaces extending each in a plane intersecting said first plane and propping against each other, whereby said elements form a rigid shield which essentially follows the course of the body portion to be protected,
   said outer surface being formed by a pressure reinforcing layer extending up to the side surfaces, and
   an inner surface opposite to said outer surface; and
   stretch resistant material interconnecting said elements at said inner surfaces to allow said elements to flex against said direction and to rigidly shield against said impact or blow.

3. Protective device as claimed in claim 2, wherein the layer consists of fiber-reinforced plastic.

4. Protective device as claimed in claim 2, wherein the material under said pressure reinforcing layer consists at least in part of structural foam.

5. Protective device as claimed in claim 4, wherein the elements consist at least in part of integral polyurethane foam.

6. Protective device as claimed in claim 2, wherein the layer consists of a compression-resistant polyurethane material joined integrally to a polyurethane foam material of the remaining element.

7. Protective device as claimed in claim 1 or 2, wherein said interconnecting material comprises a layer of non-stretching threads or fibers extending across the plane of at least one of said side surfaces and being connected to the inner surfaces, the fibers consisting of polyimide.

8. Protective device as claimed in claim 2, wherein the layer consists of metal.

9. Protective device as claimed in claim 1 or 2, wherein said interconnecting material comprises a layer of non-stretching threads or fibers extending across the plane of at least one of said side surfaces and being connected to the inner surfaces, said fibers consisting of glass.

10. Protective device as claimed in claim 1 or 2, wherein said interconnecting material comprises a layer of non-stretching threads or fibers extending across the plane of at least one of said side surfaces and being connected to the inner surfaces, said fibers consisting of metal.

11. In a protective device for dissipating energy delivered by an impact or blow from a certain direction:
   a series of pressure resistant, stiff elements substantially arranged adjacently to each other, each of said elements having
   an outer surface extending in a first plane and being exposed to said energy,
   side surfaces extending each in a plane intersecting said first plane and propping against each other, whereby said elements form a rigid shield which essentially follows the course of the body portion to be protected, and an inner surface opposite to said outer surface;

said elements being made from laminated material, each element consisting of a paunchy loop of said material, said paunchy loops being so closely adjacent to each other that said laminated material is in meandering form in cross-sectional view, whereby also in a non-stress condition the side surfaces of the loops prop against each other; and stretch resistant material interconnecting said elements at said inner surfaces to allow said elements to flex against said direction and to rigidly shield against said impact or blow.

12. Protective device as claimed in claim 11, wherein said laminated material is a metal sheet.

13. Protective device as claimed in claim 11, wherein said laminated material is a stiff plastic foil.

* * * * *